US012466057B1

(12) United States Patent
Hurley

(10) Patent No.: US 12,466,057 B1
(45) Date of Patent: Nov. 11, 2025

(54) MODULAR TOOL ORGANIZER

(71) Applicant: Jonathan Hurley, Columbia Falls, MT (US)

(72) Inventor: Jonathan Hurley, Columbia Falls, MT (US)

( * ) Notice: Subject to any disclaimer, the term of this patent is extended or adjusted under 35 U.S.C. 154(b) by 0 days.

(21) Appl. No.: 19/203,053

(22) Filed: May 8, 2025

Related U.S. Application Data

(63) Continuation of application No. 18/911,878, filed on Oct. 10, 2024.

(51) Int. Cl.
*B25H 3/04* (2006.01)

(52) U.S. Cl.
CPC ...................................... *B25H 3/04* (2013.01)

(58) Field of Classification Search
CPC ........ B25H 3/023; B25H 3/026; B25H 3/021; B25H 3/04; Y10S 211/01; B65D 25/10; H01F 7/02
USPC ..... 206/372, 378, 376, 377; 220/23.4, 23.83
See application file for complete search history.

(56) References Cited

U.S. PATENT DOCUMENTS 1,922,102 A * 8/1933 Kroecker ................ B25B 13/56 24/17 R
2,371,433 A * 3/1945 Davis ........................ B25H 3/04 211/94.01
2,541,597 A * 2/1951 Midling ................. C25D 17/08 211/113
2,580,099 A * 12/1951 Jaeger ...................... B25H 3/04 211/DIG. 1
3,763,980 A * 10/1973 Vom Stein ............. B65G 39/12 193/35 R (Continued)

FOREIGN PATENT DOCUMENTS

CN 202379202 U 8/2012
DE 20 2013 006 993 U1 11/2013

(Continued)

OTHER PUBLICATIONS

CF3D Printing, "Pack of 10 Modular Tool Box Wrench Organizers," <https://www.etsy.com/in-en/listing/1578696270/pack-of-10-modular-tool-box-wrench?click_key=c415448230b3fe4761af3e49598c66ce33d37ff0%3A1578696270&click_sum=8d2e6548&ref=related-3>, Nov. 24, 2023, 7 pages.

(Continued)

*Primary Examiner* — Steven A. Reynolds
*Assistant Examiner* — Prince Pal
(74) *Attorney, Agent, or Firm* — Christensen O'Connor Johnson Kindness PLLC

(57) ABSTRACT

A modular tool holder for holding an array of different mechanic's tools includes a tool holder component having opposed, upwardly extending first and second faces. The first and second faces are separated by an intermediate section contoured to receive and hold a mechanics tool. A male connector structure is disposed along the base of the first face and a female connector structure is disposed along the base of the second face. An abutment wall structure extends upwardly to a height above the tool holder component. The abutment wall structure has a first wall and a second wall spaced from the first wall. A female connector structure is incorporated into the first wall to interconnect with the male connector structure of the tool holder component, and a male connector structure is located at the base of the second wall to interconnect with the female connector structure of an adjacent tool holder component.

13 Claims, 14 Drawing Sheets

(56) References Cited

U.S. PATENT DOCUMENTS 3,955,715 A * 5/1976 Topor ........................ A47K 5/12 312/111
4,114,241 A * 9/1978 Bisping ...................... F16B 2/22 248/68.1
RE30,435 E * 11/1980 Fukao ........................ B41J 5/16 235/145 R
4,306,697 A * 12/1981 Mathews ................ F16L 3/222 248/68.1
4,410,095 A * 10/1983 Dembicks ................. A47F 5/08 248/225.11
4,770,297 A * 9/1988 Chang .................... B65D 85/28 206/379
5,054,636 A * 10/1991 Netzer ................... B65D 67/02 24/456
5,381,916 A * 1/1995 Strawder ............ B65D 21/0202 220/212.5
5,503,288 A * 4/1996 Conconi ............ B65D 21/0204 220/4.21
5,535,881 A * 7/1996 Krivec ................... B25H 3/003 206/483
5,645,177 A * 7/1997 Lin .......................... B25H 3/04 211/69.5
5,788,303 A * 8/1998 Chia-Hsiang .......... B25H 3/003 294/143
5,855,285 A * 1/1999 Laird ..................... B25H 3/003 206/378
6,044,971 A * 4/2000 Esposito ............ A61B 17/1222 206/339
6,047,827 A * 4/2000 Huang ................... B25H 3/003 206/349
6,059,631 A * 5/2000 Maddock ............... A63H 33/12 446/127
6,061,880 A * 5/2000 Senninger ............... F16L 3/222 24/339
6,109,569 A * 8/2000 Sakaida .................. F16L 3/222 248/62
6,378,811 B1 * 4/2002 Potter ...................... H02G 3/30 248/65
6,708,931 B2 * 3/2004 Miura ..................... F16B 37/00 248/74.1
6,932,223 B1 * 8/2005 Lee .......................... B25H 3/04 206/349
7,178,670 B2 * 2/2007 Chen ........................ B25H 3/04 211/70.6
7,185,770 B1 * 3/2007 Roten .................... A47B 81/00 211/70.6
7,533,852 B2 * 5/2009 Stigler .................... F16L 3/223 248/65
7,622,682 B2 * 11/2009 Malin ...................... H02G 3/32 174/72 A
7,815,058 B2 * 10/2010 Cheng ...................... B25H 3/04 206/349
7,987,981 B1 * 8/2011 Lee .......................... B25H 3/04 206/45.24
8,020,259 B2 * 9/2011 Ho .......................... F16L 3/222 24/339
8,074,945 B2 * 12/2011 Schoenau ................. F16L 5/14 248/65
8,308,408 B2 * 11/2012 Gaudette ................... B60P 7/15 410/43
8,413,797 B2 * 4/2013 Soloman ................. B65B 5/103 53/493
8,636,144 B1 1/2014 Lawery et al.
9,668,617 B1 6/2017 Barnes
9,682,471 B2 6/2017 Jacobson et al.
9,962,827 B2 * 5/2018 Kao ......................... B25H 3/04
10,022,857 B2 * 7/2018 Kao ......................... B25H 3/04
10,151,406 B2 * 12/2018 Netke ...................... B60R 16/08
10,561,238 B1 * 2/2020 Gutierrez ................ A47F 7/283
10,563,945 B2 * 2/2020 Tucker .................. F41C 33/003
10,843,328 B2 * 11/2020 Wacker ..................... F16B 1/00
11,103,989 B2 * 8/2021 Hurley .................. H01F 7/0252
11,110,589 B2 * 9/2021 Hurley .................. H01F 7/0252
11,662,041 B2 * 5/2023 Laughlin ................. F16L 3/237 248/68.1
11,707,832 B2 * 7/2023 Hurley ..................... B25H 3/06 206/373
12,128,541 B2 * 10/2024 Hurley ................... B25H 3/003
12,331,860 B2 * 6/2025 Sylvester ................. H02G 3/32
2003/0141266 A1 * 7/2003 Lin .......................... B25H 3/04 211/70.6
2004/0206711 A1 10/2004 Hoftman
2006/0243686 A1 * 11/2006 Grayson ............. A47B 81/005 211/70.6
2006/0261063 A1 * 11/2006 Dyehouse .......... B65D 21/0231 220/23.4
2007/0023369 A1 * 2/2007 Lin ........................ B25H 3/003 248/291.1
2011/0204051 A1 * 8/2011 Pawl .................. B65D 21/0231 29/428
2015/0252827 A1 * 9/2015 Ou ........................... B25H 3/04 211/13.1
2018/0104812 A1 * 4/2018 Wacker ..................... F16B 1/00
2018/0361564 A1 * 12/2018 Hurley ................... B25H 3/003
2020/0122315 A1 * 4/2020 Hurley ..................... B25H 3/04
2020/0206891 A1 * 7/2020 Lin ........................ B25H 3/003
2022/0176543 A1 * 6/2022 Hurley ..................... B25H 3/06
2024/0183465 A1 * 6/2024 Sommer .................. H02G 3/32
2024/0246220 A1 * 7/2024 Chen ........................ B25H 3/04
2024/0316751 A1 * 9/2024 Hurley ................... B25H 3/003
2025/0073888 A1 * 3/2025 Cacciabeve .............. B25H 3/04

FOREIGN PATENT DOCUMENTS

EP 0088203 A1 9/1983
JP 2022-164225 A 10/2022

OTHER PUBLICATIONS

Ernst Manufacturing, 5402 Wrench Pro—Modular Toolbox Wrench Organizer for 20 Wrenches, <https://www. amazon.co.uk/Ernst-Manufacturing-5402-Wrench-Pro/dp/B0C66L8992?th=1>, Jan. 1, 2024, 6 pages.

Flyvole, "Flyvole Tool Box Organizer Tray, Toolbox Desk Drawer Organizer, Tool Box Tray, Toolbox Organization Storage for Rolling Tool Chest (60 PCS)", <https://www.amazon.com/Upgraded-FLYVOLE-Organizer-Toolbox-Organization/dp/B0CNRMSCXX?th=1>, Nov. 21, 2023, 8 pages.

Toolbox Widget, "Wrench Organizer [DIY]", <https://toolboxwidget.com/products/diy-wrench-organizer-small?_ab=0&_fd=0&_sc=1>, Apr. 30, 2022, 22 pages.

Toolbox Widget, "Modular Plier Organizers Kit", <https://www.amazon.in/Toolbox-Widget-Plier-Organizer-Kit/dp/B08ZNXTL2M?th=1>, Oct. 19, 2021, 4 pages.

Toolbox Widget "Modular 3/8" Socket Organizers," <https://www.amazon.in/ToolBox-Widget-Organizers-Organization-Accountability/dp/B08ZNTZ8CX/ref=pd_bxgy_thbs_d_sccl_2/257-5362075-5451626?pd_rd_w=LOrCx&content-id=amzn1.sym.f406cf11-1229-4650-9e74-6c521f43ef93&pf_rd_p=f406cf11-1229-4650-9e74-6c521f43ef93&pf_rd_r=5RPP81ET3BWTEBRSESKR&pd_rd_wg=oqJIw&pd_rd_r=c05ac1de-cc8e-4743-92f0-07e079535069&pd_rd_i=B08ZNTZ8CX&psc=1>, Feb. 15, 2022, 6 pages.

Toolbox Widget, "Modular Screwdriver Organizers for Tool Box," <https://www.amazon.in/ToolBox-Widget-Screwdriver-Professional-Accountability/dp/B08Q4H4RFL?th=1>, Sep. 14, 2021, 5 pages.

Weysat, "24 Pcs Storage Bins Parts Racks," <https://www.amazon.in/Weysat-Storage-Stackable-Organizer-Hardware/dp/B0BZJ2DXNB>, May 29, 2023, 6 pages.

Qpey, "24 Pack Tool Box Organizer Tool Tray Dividers," <https://www.amazon.in/QPEY-Organizer-Dividers-Silverware-Workbench/dp/B0C1TXF315>, Nov. 21, 2023, 6 pages.

* cited by examiner

MODULAR TOOL ORGANIZER

CROSS-REFERENCES TO RELATED APPLICATIONS

This application is a continuation of U.S. patent application Ser. No. 18/911,878, filed Oct. 10, 2024, the entire disclosure of which is expressly incorporated herein by reference.

BACKGROUND

There are currently few practical and inexpensive products available to the "do it yourself" ("DIY") consumer for the custom organization of mechanics and other tools for storage. Most DIY individuals keep their wrenches, screw drivers, plyers, etc., stored in tool boxes, drawers. or other containers. Because the tools typically are stored together with little or no organization within the tool box or drawer, it is often difficult to find a particular tool needed for use, due to the lack of organization of the tools.

Therefore, there is a need for a tool organizer that facilitates easy storing and organizing of tools within a tool box and/or drawer. There is also a need for an inexpensive, but durable, device for the DIY individual that facilitates easy storing and organizing of numerous different tools while requiring few separate components. The present disclosure seeks to address this need.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present invention, a modular tool holder is provided for holding an array of different mechanic's tools. The modular tool includes a tool holder component having opposed first and second faces each extending upwardly from a base, the first and second faces separated by an intermediate section contoured to receive and hold a mechanics tool, the tool holder component comprising a male connector structure disposed along the base of the first face and a female connector structure disposed along the base of the second face, an abutment wall structure extending upwardly from a base to a height above the tool holder component, the abutment wall structure having a first wall and a second wall spaced from the first wall, a female connector structure incorporated into the first wall to interconnect with the male connector structure of the tool holder component, and a male connector structure at the base of the second wall to interconnect with the female connector structure of an adjacent tool holder component.

In any of the embodiments described herein, wherein the male connector structure comprising at least one projection member extending from the base of the first face of the tool holder component and from the base of the second wall of the abutment wall structure.

In any of the embodiments described herein, wherein the female connector structure is configured to receive the at least one projection member.

In any of the embodiments described herein, wherein the male connector structure is selected from the group including: a plurality of posts; a blade; a plurality of detents.

In any of the embodiments described herein, wherein the female connector structure is configured to receive the plurality of posts.

In any of the embodiments described herein, wherein the female connector structure is configured to receive the blade.

In any of the embodiments described herein, wherein the female connector structure is configured to receive the plurality of detents.

In any of the embodiments described herein, wherein the plurality of posts extend upwardly and the female connector structure comprises sockets for receiving the plurality of posts.

In any of the embodiments described herein, wherein the plurality of detents extend laterally from the base of the first face of the tool holder component and from the base of the second wall of the abutment wall structure.

In any of the embodiments described herein, wherein the female connector structure comprising apertures in the second face of the tool holder component or the first wall of the abutment wall structure for receiving the plurality of detents.

In any of the embodiments described herein, wherein the detents comprise a shank attached to the base of the first face of the tool holder component and to the base of the second wall of the abutment wall structure, and a hook at the distal end of the shank.

In any of the embodiments described herein, wherein the shank extends through an aperture in the second face of the tool holder component or the first wall of the abutment wall structure, and the hook is configured to bear against the inside surface of the second face of the tool holder component or the inside surface of the first wall of the abutment wall structure.

In any of the embodiments described herein, wherein the blade extends upwardly and the female connector structure comprises an interior of the second face of the tool holder component or the interior of the first wall of the abutment wall structure.

In any of the embodiments described herein, further comprising a lock for assisting in maintaining the engagement of the blade with the female connector structure.

In any of the embodiments described herein, wherein the lock comprising a first ridge extending along the blade and a second ridge extending along the interior of the second face of the tool holder component or the interior of the first wall of the abutment wall structure, wherein during engagement of the tool holder component with the abutment wall structure, the first ridge slides over the second ridge to a position side-by-side to the second ridge.

In any of the embodiments described herein, wherein the blade extends along the base of the first face of the tool holder component and along the base of the second wall of the abutment wall structure.

In any of the embodiments described herein, wherein the blade is spaced outwardly from the base of the first face of the tool holder component and outwardly from the base of the second wall of the abutment wall structure.

In any of the embodiments described herein, further comprising a plurality of side strips on at least one the first and second faces of a tool holder component.

In any of the embodiments described herein, further comprising a plurality of side strips on at least one the first and second walls of the abutment wall structure.

In any of the embodiments described herein, wherein the abutment wall structure includes an upwardly directed surface for receiving indicia related to the modular tool holder.

In any of the embodiments described herein, wherein the abutment wall structure is configured to receive a label surface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
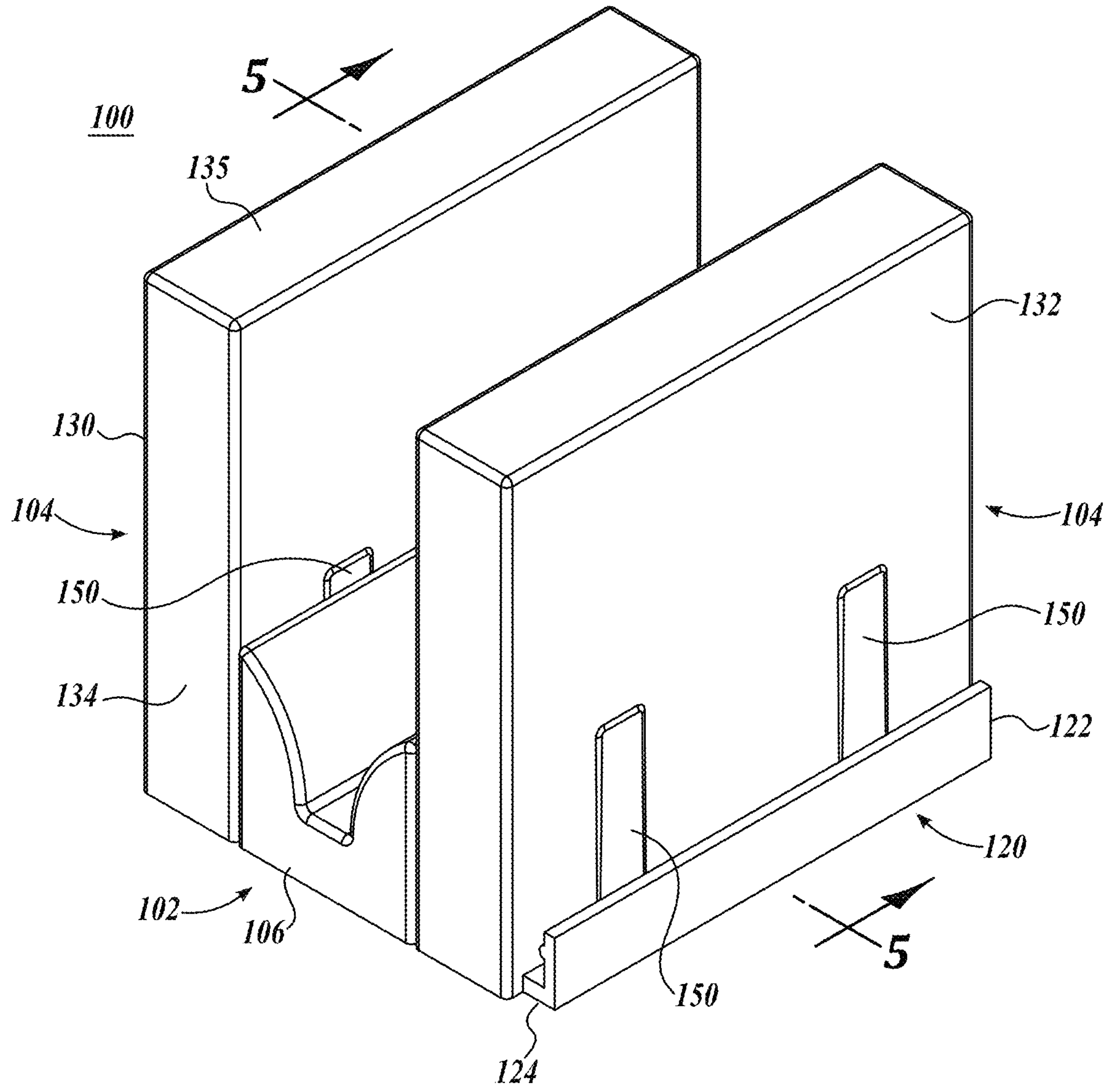
FIG. 1 is a pictorial view of a first embodiment of a modular tool holder of the present disclosure showing a tool holder component assembled with two abutment wall structures.
Figure 2:
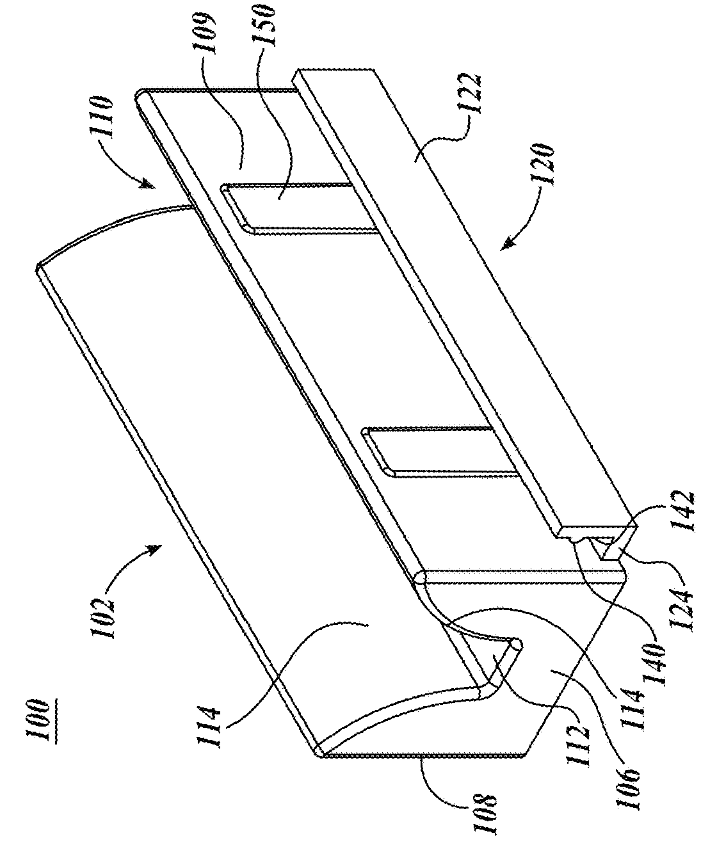
FIG. 2 is a pictorial view of the tool holder component of FIG. 1.

Various example embodiments of the present disclosure are described below with reference to the accompanying drawings in which some example embodiments are illustrated. In the figures, the thicknesses of lines, layers and/or regions may be exaggerated for clarity.

While example embodiments are capable of various modifications and alternative forms, embodiments thereof are shown by way of example in the figures and are described in detail below. It should be understood, however, that there is no intent to limit example embodiments to the particular forms disclosed, but on the contrary, example embodiments are to cover all modifications, equivalents, and alternatives falling within the scope of the disclosure.

It is understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (e.g., “between” versus “directly between,” “adjacent” versus “directly adjacent,” etc.).

The terminology used herein is for the purpose of describing particular embodiments only and is not intended to be limiting of example embodiments. As used herein, the singular forms “a,” “an” and “the” are intended to include the plural forms as well, unless the context clearly indicates otherwise. It will be further understood that the terms “comprises,” “comprising,” “includes” and/or “including,” when used herein, specify the presence of stated features, integers, steps, operations, elements and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be considered in the specific context this definition is given herein.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. Further, it will be appreciated that embodiments of the present disclosure may employ any combination of features described herein.

The present application may include references to directions, such as “forward,” “rearward,” “front,” “back,” “ahead,” “behind,” “upward,” “downward,” “above,” “below,” “top,” “bottom,” “right hand,” left hand,” “in,” “out,” “extended,” “advanced,” “retracted,” “proximal,” “distal,” “central,” “vertical,” etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term “plurality” to reference a quantity or number. In this regard, the term "plurality" is meant to be any number that is more than one, for example, two, three, four, five, etc.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out. If a quantitative value is needed to render the applicable parameter sufficiently definite, the applicable parameter is within five percent (5%) of the designated parameter value.

Further, the term "mechanic's tools" may include all manner of tools used by mechanics, including, but not limited to, wrenches, pliers, screw drivers, sockets, socket wrenches, rachet wrenches, hex wrenches, etc.

In the following description, various embodiments of the present disclosure are described. In the following description and in the accompanying drawings, the corresponding systems assemblies, apparatus, and units may be identified by the same part number, but with an alpha suffix or by a prime ("'") or double prime ("''") or even a triple prime ("'''") designation. The descriptions of the parts/components of such systems assemblies, apparatus, and units that are the same or similar are not repeated so as to avoid redundancy in the present application.

Referring initially to FIGS. 1-5, in a first embodiment, a modular tool holder 100 for holding an array of different mechanic's tools is shown as comprising a tool holder component 102 and an abutment wall structure 104 which are assembled together to hold all manner of tools used by mechanics, including, but not limited to, wrenches, pliers, screw drivers, sockets, socket wrenches, rachet wrenches, hex wrenches, etc. In this regard, FIG. 1 shows a tool holder component 102 assembled to an abutment wall structure 104 at each side the tool holder component 102. Additional tool holder components 102 and additional abutment wall structures 104 can be attached to hold additional mechanics tools in a tool box or tool chest or at other desired locations.

The tool holder component 102 is configured to receive a mechanic's tool for holding. The tool holder component 102 incudes a base portion 106 and exterior sides or faces 108 and 109 extending upwardly from the base portion. A tool holding channel 110 is formed by a bottom tool receiving surface 112. Sloped interior sides 114 extend upwardly from the surface 112 to intersect with the exterior faces 108 and 109. The interior sides 114 are shown as curving outwardly toward the exterior faces 108 and 109 in the upwardly direction to define a lead-in for the tool to be held. Rather than being curved, the interior sides 114 can be substantially planar or can be formed by a plurality of planar sections.

Figure 5:
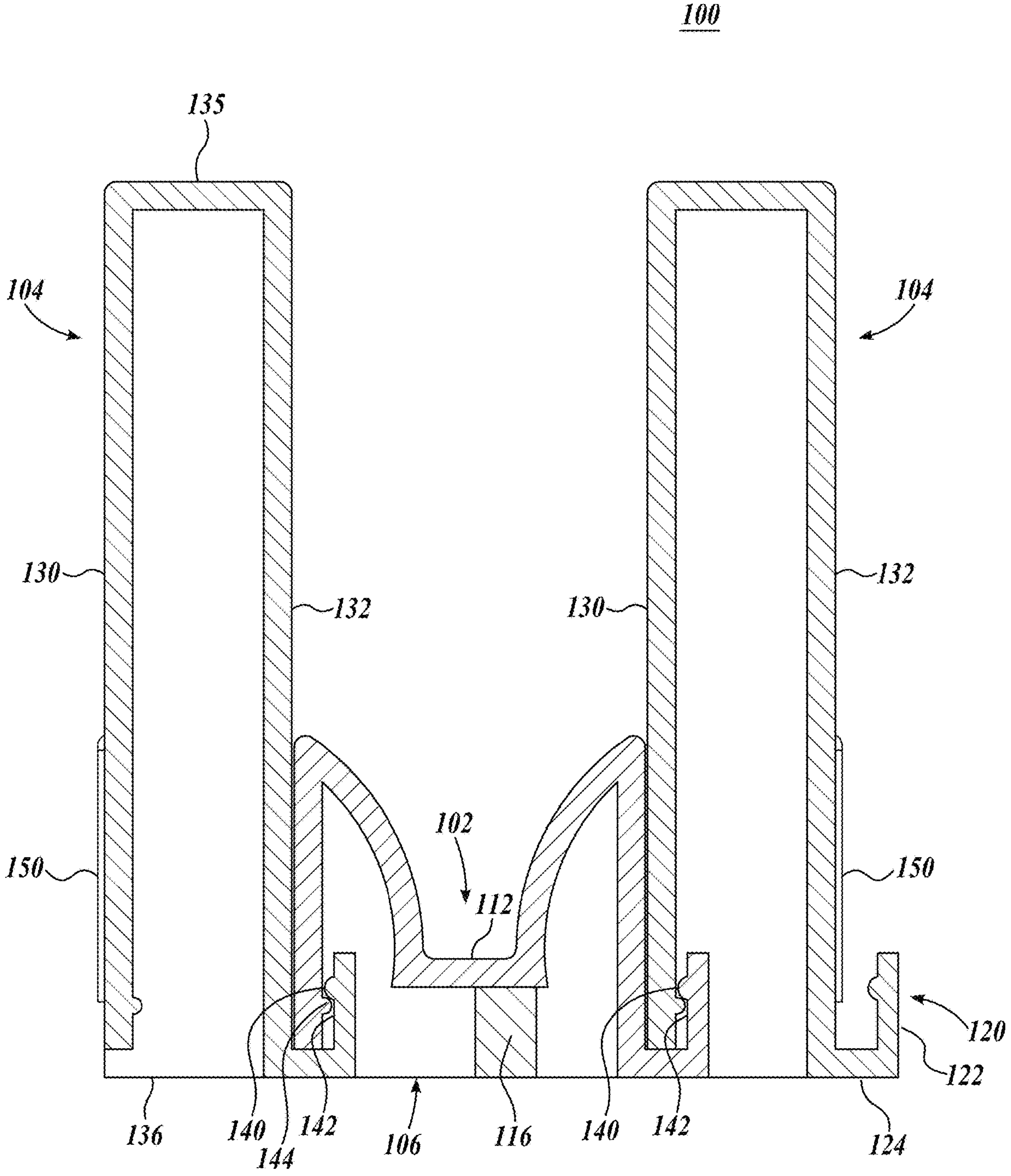
FIG. 5 is a cross-sectional view of the modular tool holder of FIG. 1.
Figure 6:
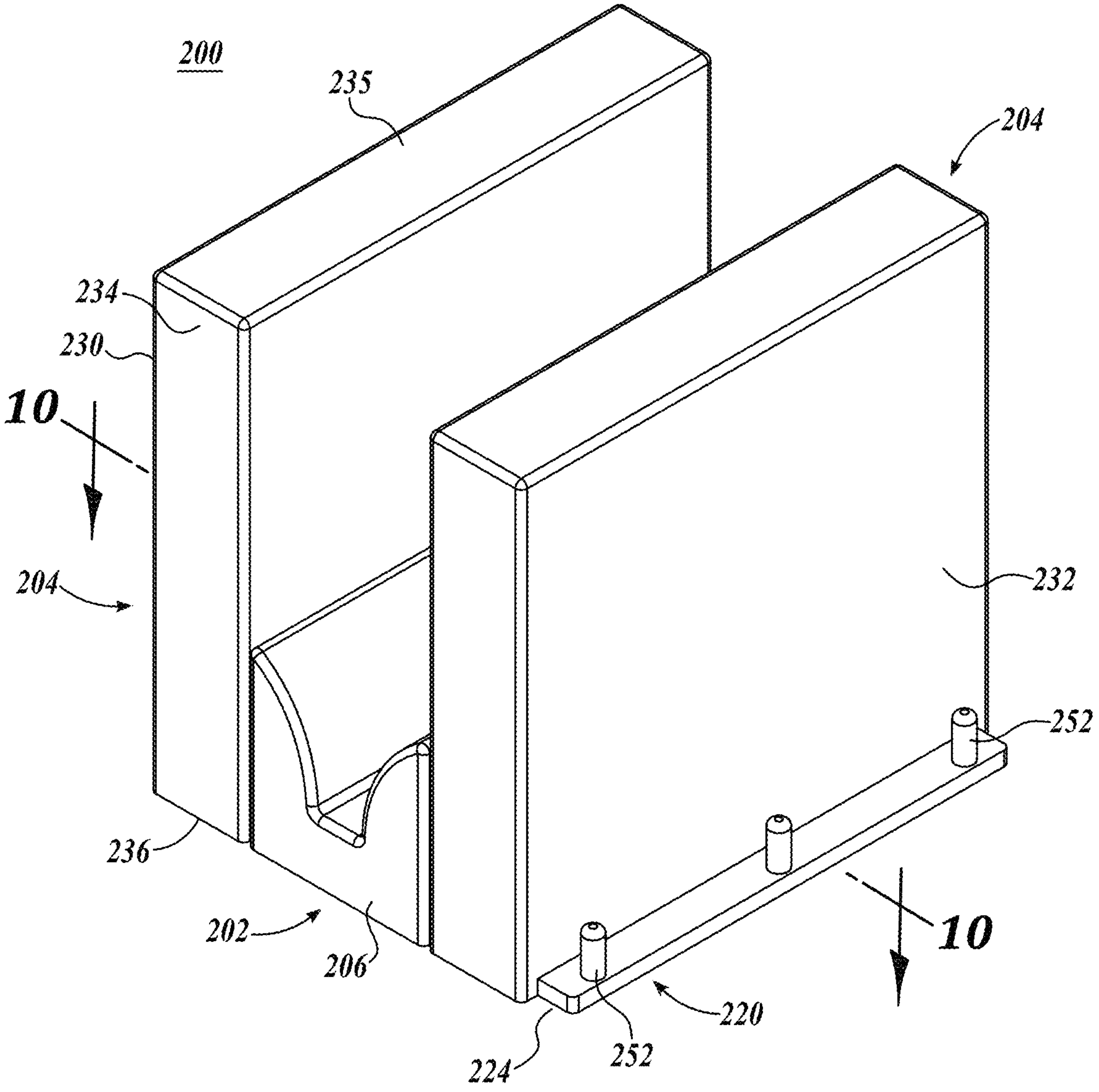
FIG. 6 is a pictorial view of a second embodiment of a modular tool holder of the present disclosure showing a tool holder component assembled with two abutment wall structures.
Figure 8:
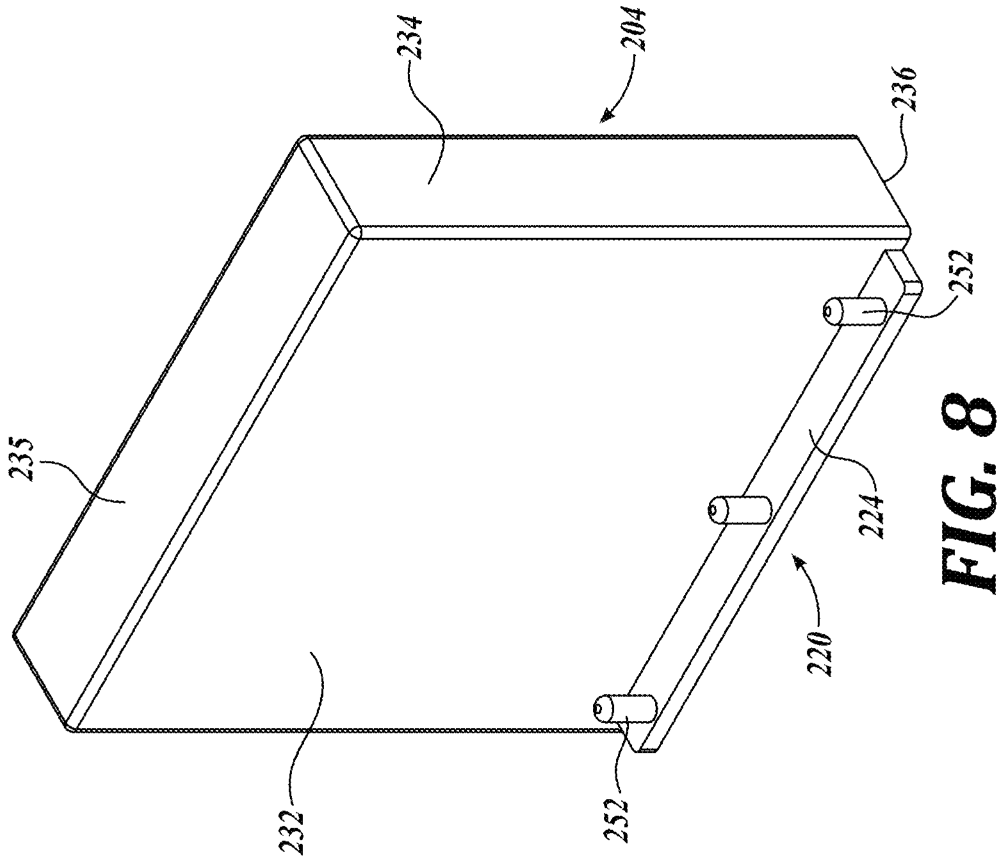
FIG. 8 is a pictorial view of an abutment wall of FIG. 6.

As shown in FIGS. 5 and 6, a circular socket 116 can be formed in the interior of the tool holder component 102 to receive a magnet therein. The bottom of the socket 116 can be substantially coplanar with the bottom surface of the base portion 106. The magnet can be held in the socket 116 by any convenient means, such as by interference fit or by an adhesive, etc. The magnet functions to hold the modular tool holder securely to a ferro magnet surface, such as the drawer of a tool chest. Although the socket 116 is shown as being of a round shape, it can formed in other shapes, such as square, rectangular, hexagonal, octagonal, etc.

A male connector structure 120 projects from and extends along the base portion 106 of the tool holder component 102. The male connector structure 120 is illustrated as being in the form of an elongated blade 122 extending along the length of the adjacent exterior side or face 109 of the connector structure. The bottom edge of the blade 122 is attached to the base portion 106 by a web 124. The lower surface of the web is shown as coplanar with the bottom of the base portion 106, but that does not need to be the case. The blade 122 extends upwardly from the web, but typically not as high as the exterior side or face 109.

Figure 4:
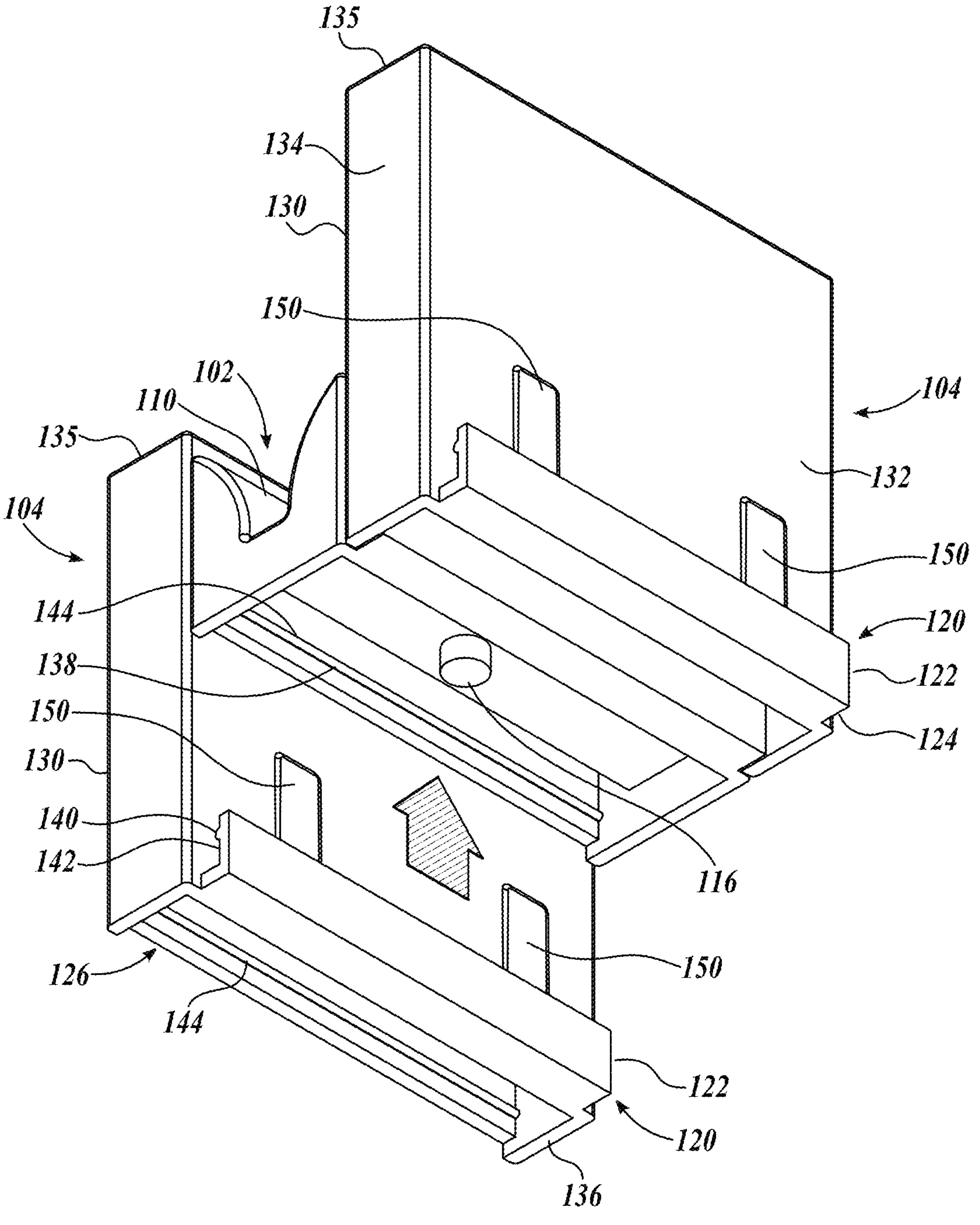
FIG. 4 is the pictorial view of the modular tool holder of FIG. 1 illustrating the assembly and interconnection of the abutment wall with the tool holder component.

A female connector structure 126 is incorporated into the side or face 108 of the connector structure. In this regard, as shown in FIG. 5, the interior of the tool holder component 102 can be substantially hollow. In this regard, the inside surface of the exterior face 108 is open to at the bottom of the base portion 106 so as to be able to receive therein the male connector structure 120 of an abutment wall structure 104, as discussed below and as shown in FIGS. 4 and 5.

Figure 3:
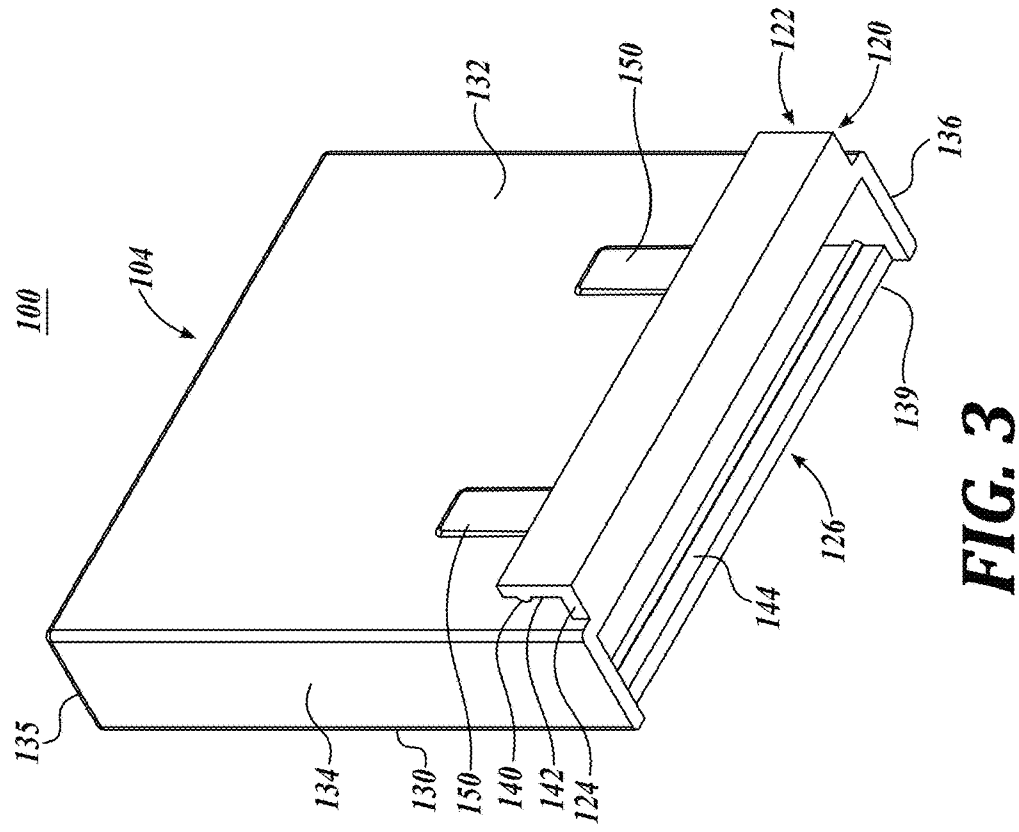
FIG. 3 is a pictorial view of an abutment wall structure of FIG. 1.

Abutment wall structures 104 are shown as being for a generally hollow rectangular or square construction, but can be of other shapes or constructions. Referring specifically to FIGS. 3 and 4, the abutment wall structures 104 include a first upright wall 130 and a second upright wall 132 spaced from the first wall 130 by edge sections 134. A top edge section 135 can be used to close of the top of the abutment wall structure 104. Alternatively, the top of the abutment wall structure can be left open so as to receive therein a top edge panel or section that includes indicia, for example, the type, size, or other identifying information regarding the mechanic's tool in question.

As will be appreciated, braces or webbing can extend between the first and second walls 132 and 134 to enhance the rigidity of the abutment wall structure 104. Also, although the first and second walls 130 and 132 are shown as of solid construction, the first and second walls can be of other configurations. For example, the first and second walls can be of a grid or lattice construction or can be of a perforated construction.

In the manner discussed above with respect to tool holder component 102, a male connector structure 120 projects from and extends along the base portion 136 of the abutment wall structure 104. The male connector structure 120 is illustrated as being in the form of an elongated blade 122 extending along the length of the adjacent second wall 132. The bottom edge of the blade 122 is attached to the base portion 136 by a web 124. The lower surface of the web is shown as coplanar with the bottom of the base portion 136, however, this does not need to be the case. The blade 122 extends upwardly a distance from the web 124, for example, in the manner for the blade 122 attached to the tool holder component 102.

As shown in FIGS. 3 and 4, and as noted above, the interior of the abutment wall structure 104 can be substantially hollow and serves as the female connector structure 126. In this regard, the inside surface of the first wall 130 is open to at the bottom of the base portion 136 so as to be able to receive therein the male connector structure 120 of a tool holder component, as discussed below and as shown in FIGS. 5 and 6.

By the foregoing construction, the tool holder component 102 is conveniently assembled with abutment wall structures 104 by placing the second wall 132 against the exterior side of face 108 of an abutment wall structure 104, as shown in FIG. 5, and sliding the blade 122 of the abutment wall structure 104 behind the exterior side or face 108 so that the lower portion of the exterior face 108 is held captive between the blade 122 and the second wall 132 of the abutment wall structure. As shown in FIG. 5, the lower edge of exterior face 108 is recessed at 138 to clear web 124.

Likewise, the other side of the tool holder component 102 is conveniently assembled with abutment wall structures 104 by placing the first wall 130 against the exterior side of face 109 of an abutment wall structure 104, as shown in FIG. 4, and then sliding the blade 122 of the tool holder component 102 behind the first wall 130 of the abutment wall structure so that the lower portion of the first wall 130 is held captive between the blade 122 and the exterior face 109 of the tool holder component 102. As shown in FIG. 3, the lower edge of the first wall is recessed at 139 to clear web 124.

A locking system may be provided to help maintain the tool holder component 102 engaged with the abutment wall structures 104. In this regard, first ridge 140 extends along the side wall 142 of the blade 112 facing the outer face 109 of the tool holder component 102 and also the side wall 142 of the blade 122 facing the second wall 132 of the abutment wall structure 104, see, for example, FIGS. 2-5.

A corresponding second ridge 144 extends along the interior face 108 of the tool holder component and along the inside of the first wall 130 of the abutment wall structure 104 at an elevation just below the elevation of the first ridges 140, so that when the tool holder components 102 are slidably engaged with the abutment wall structures 104, the blades 122 flex outwardly from the abutment wall structure second wall 123 and from the exterior face 109 of the tool holder component to allow the first ridges 140 to slide over a corresponding second ridge 144 and then lock against the upper side of the corresponding second ridge 144.

Upright slide strips 150 extend upwardly from the bottom of the first and second walls 130 and 132 of the abutment wall structures. The slide strips 150 provide reduces area surfaces for the exterior faces 108 and 109 of the tool holder components to slide against during assembly of the modular tool holder 100, thereby facilitating the assembly of the modular tool holder. Upright slide strips 150 may also extend upwardly from the bottom of the first and second walls 108 and 109 of the tool holder components 102. See FIG. 2.

Referring to FIGS. 6-10, a second embodiment 200 of a modular tool holder according to the present disclosure is shown. In this regard, the components of the modular tool holder 200 that correspond to the modular tool holder 100 are identified with a corresponding 200 series part number. Further, the aspects of the modular tool holder 200 that are the same or similar to modular tool holder 100 are not repeated.

Regarding how the modular tool holder 200 differs from modular tool holder 100, in modular tool holder 200, a male connector structure 220 projects from and extends along the base portion 206 of the tool holder component 202. The male connector structure 220 is illustrated as being in the form of a plurality of upstanding posts 252 spaced along the length of the adjacent exterior side or face 209 of the modular tool holder component 202. The bottoms of the posts 252 are attached to the base portion 206 of the tool holder component by a web 224. The underside or lower surface of the web 224 is shown as coplanar with the bottom of the base portion 206, but that does not need to be the case. The posts 252 extend a short distance upwardly from the web 224, for example from about ¼ inch to about 1 inch above the web.

Figure 7:
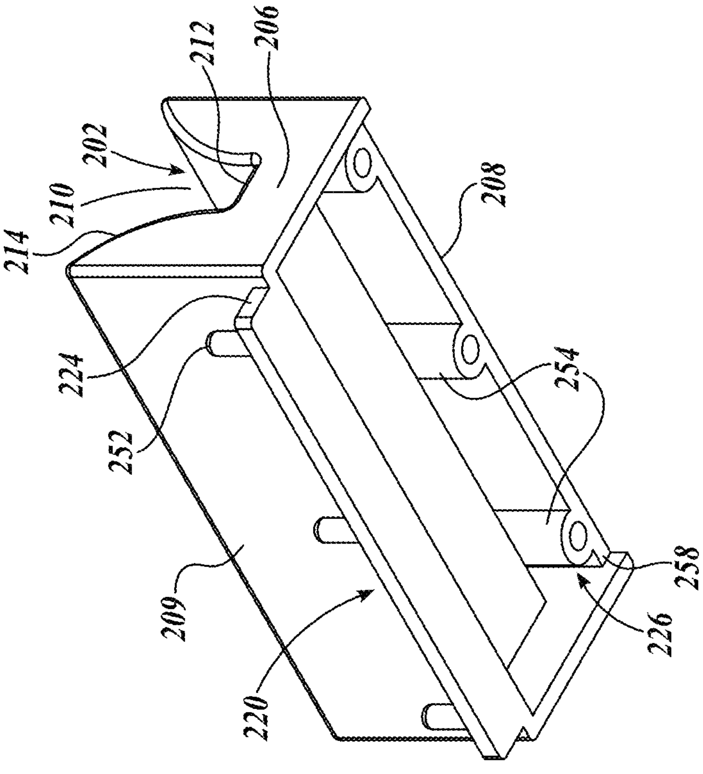
FIG. 7 is a pictorial view of the tool holder component of FIG. 6.
Figure 9:
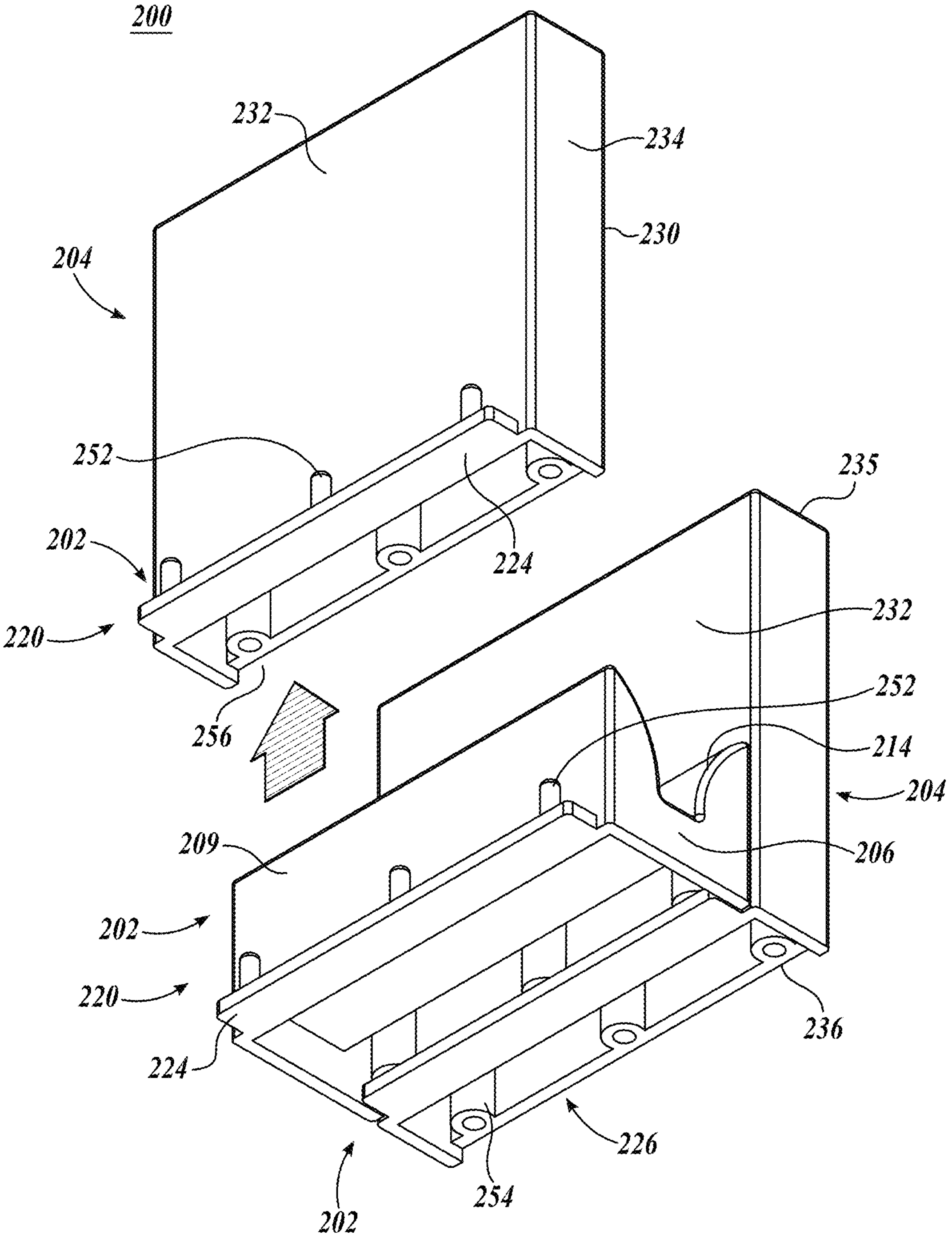
FIG. 9 is the pictorial view of the modular tool holder of FIG. 6 illustrating the assembly and interconnection of the abutment wall with the tool holder component.
Figure 10:
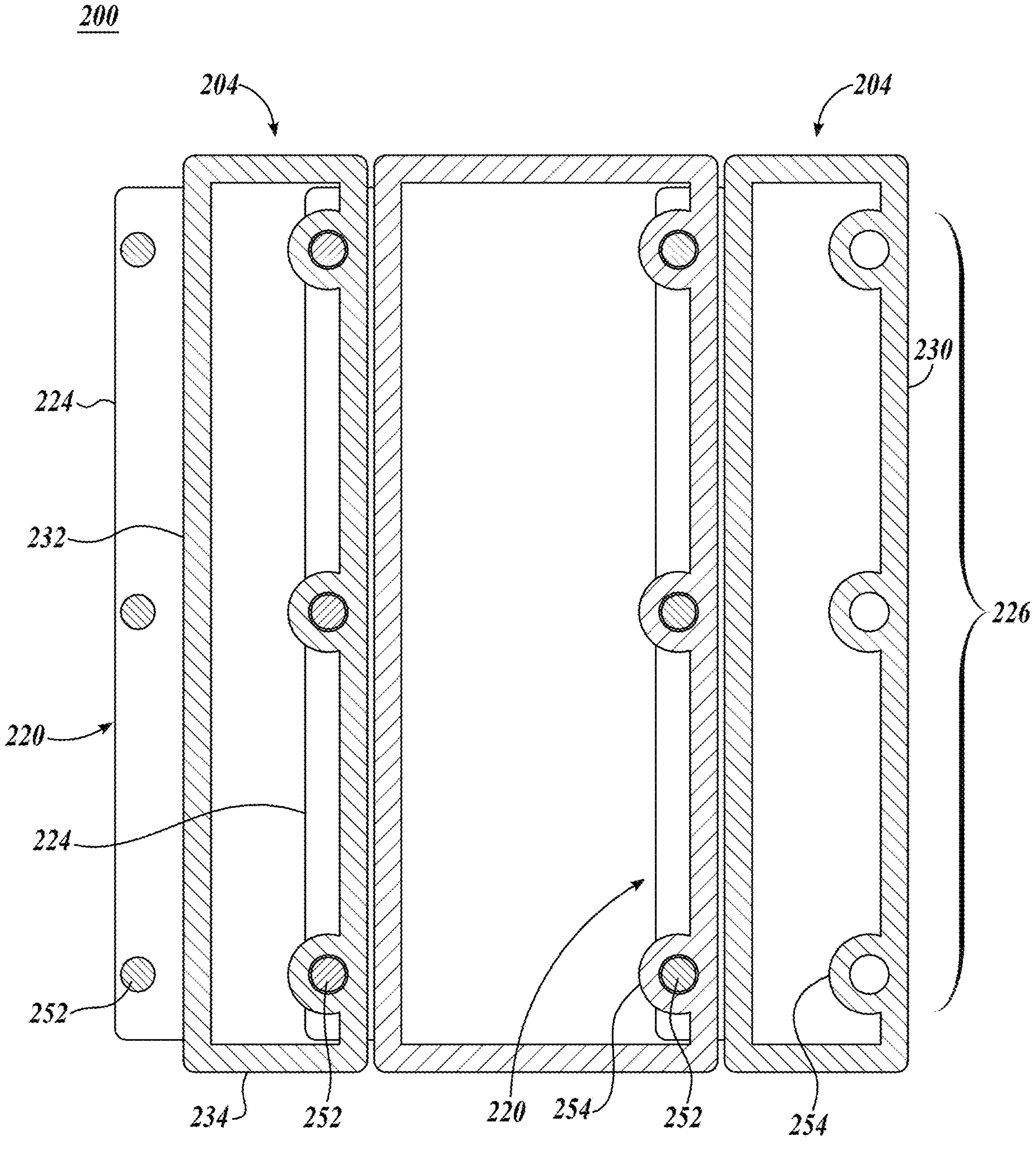
FIG. 10 is a cross-sectional view of the modular tool holder of FIG. 6.
Figure 11:
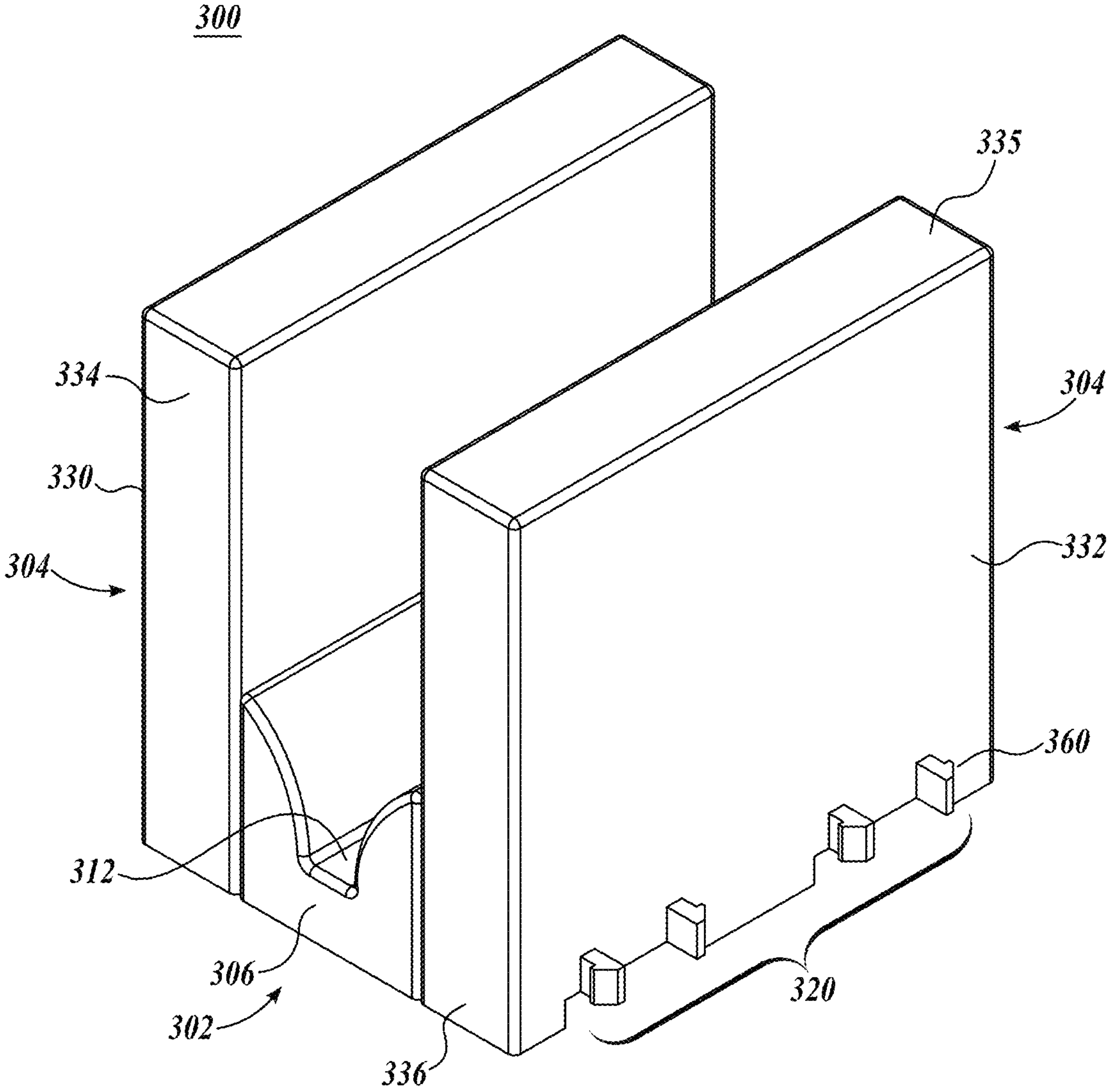
FIG. 11 is a pictorial view of a third embodiment of a modular tool holder of the present disclosure showing a tool holder component assembled with two abutment wall structures.

As shown in FIGS. 7, 9, and 10, the interior of the tool holder component 202 can be substantially hollow and accommodates the female connector structure 226. In this regard, the female connector structure 226 is shown as being in the form of sockets 254. The sockets 254 extend upwardly from the base portion 206, along the inside surface of the exterior face 208 of the tool holder component 202 to receive therein posts 252 of the male connector structure 220 of an abutment wall structure 204, as discussed below and as shown in FIGS. 9 and 10.

In the manner discussed above with respect to tool holder component 202, a male connector structure 220 projects from and extends along the base portion 236 of the abutment wall structure 204. The male connector structure 220 is illustrated as being in the form of a plurality of upstanding posts 252 spaced along the length of the adjacent the exterior the second wall 232 of the abutment wall structure 204. The bottoms of the posts 252 are attached to the base portion 236 of the abutment wall structure 204 by a web 224. The lower surface of the web 224 is shown as coplanar with the bottom of the base portion 236, however, this does not need to be the case. The posts 252 extend upwardly a distance from the web 224, for example, in the manner for the posts 252 attached to the tool holder component 202.

As shown in FIGS. 9 and 10, and as noted above, the interior of the abutment wall structure 204 can be substantially hollow and accommodates the female connector structure 226. In this regard, the female connector structure 226 is shown as being in the form of sockets 254. The sockets 254 extend upwardly from the base portion 236, along the inside surface of the first wall 130 to receive therein posts 252 of the male connector structure 220 of a tool holder component 202, as discussed below.

By the foregoing construction, the tool holder component 202 is conveniently assembled with abutment wall structures 204 by placing the first wall 230 against or next to the exterior side of face 209 of an abutment wall structure 204, as shown in FIG. 9, and sliding the posts 252 of the tool holder into the sockets 254 of the abutment wall structure 204 so that the abutment wall structure is attached to the male connector structure 220 of the tool holder component 102. As shown in FIG. 9, the lower edge of the first wall is recessed at 256 to clear web 224.

Likewise, the other side of the tool holder component 202 is conveniently assembled with an abutment wall structure 204 by placing the second wall 232 of the abutment wall structure against the exterior side of face 208 of the tool holder component 202 and then sliding the posts 252 of the male connector structure 220 of the abutment wall structure 204 into the sockets 254 of the tool holder component 202 so that the female connector structure 226 of the tool holder component is attached to the male connector structure 220 of the abutment wall structure. As shown in FIG. 7, the lower edge of the exterior side of face 208 is recessed at 258 to clear web 224.

Referring to FIGS. 11-16, a third embodiment 300 of a modular tool holder according to the present disclosure is shown. In this regard, the components of the modular tool holder 300 that correspond to the modular tool holders 100 and/or 200 are identified with a corresponding 300 series part number. Further, the aspects of the modular tool holder 300 that are the same or similar to modular tool holders 100 and/or 200 are not repeated.

Regarding how the modular tool holder 300 differs from modular tool holders 100 and/or 200, in modular tool holder 300, a male connector structure 320 is composed of a plurality of detents 360 that project laterally from the base portion 306 along the exterior side of face 309 of the tool holder component 302. In one example, the configuration of the detents 360 is illustrated as being in the form of a shank section 362 anchored to the exterior side or face 309 at spaced apart locations along the length of the side or face. The distal ends of the shank sections 362 terminate at hook sections 364 that project from one side of the shank section 362.

As shown in FIGS. 11, 12, 15, and 16, the detents 360 are arranged in pairs so that the hook sections 364 of each pair project away from the other detent 360 of the pair.

The distal or leading surface of each hook section forms a ramp surface 366 that facilitates the engagement of the detents with the female connector structure 326 of the abutment wall structure 304, as discussed below.

The female connector structure 326 of the tool holder component 302 is in the form of a rectangular opening 368 formed in the bottom of the exterior side or face 308 of the tool holder component. The opening 368 corresponds to a pair of detents 360 of an adjacent abutment wall structure 304. The opening 368 is a width W that is slightly greater than the distance L1 spanning the far surfaces of the detent shank sections 362 of a detent pair, but is slightly less than the distance L2 spanning the far surfaces of the hook sections of a detent pair. In this manner, as discussed below, when a detent pair is engaged with an opening 368 of a female connector structure, the detents are locked into engagement with the opening.

Figure 13:
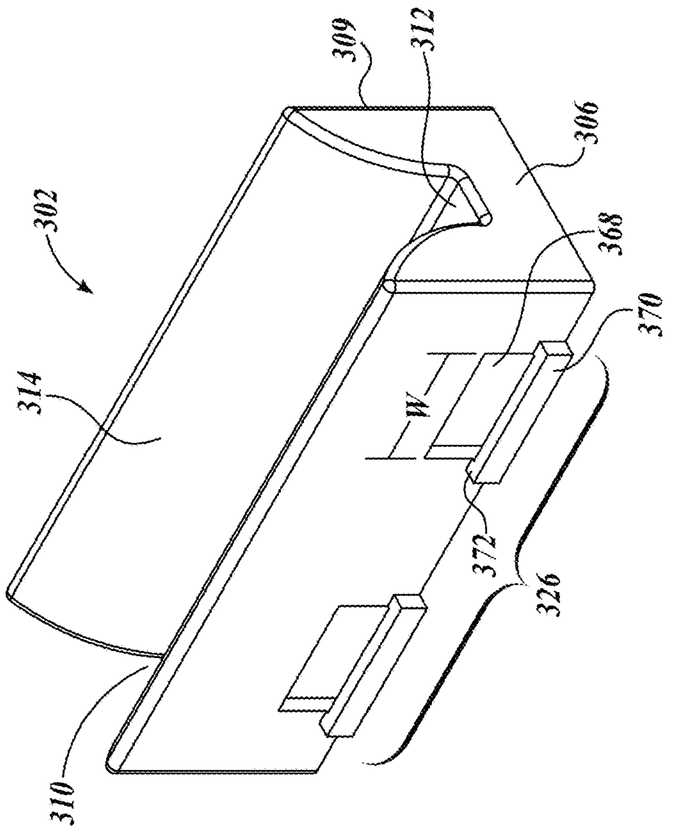
FIG. 13 is a view similar to FIG. 12 taken from opposite side of the tool holder component.
Figure 14A:
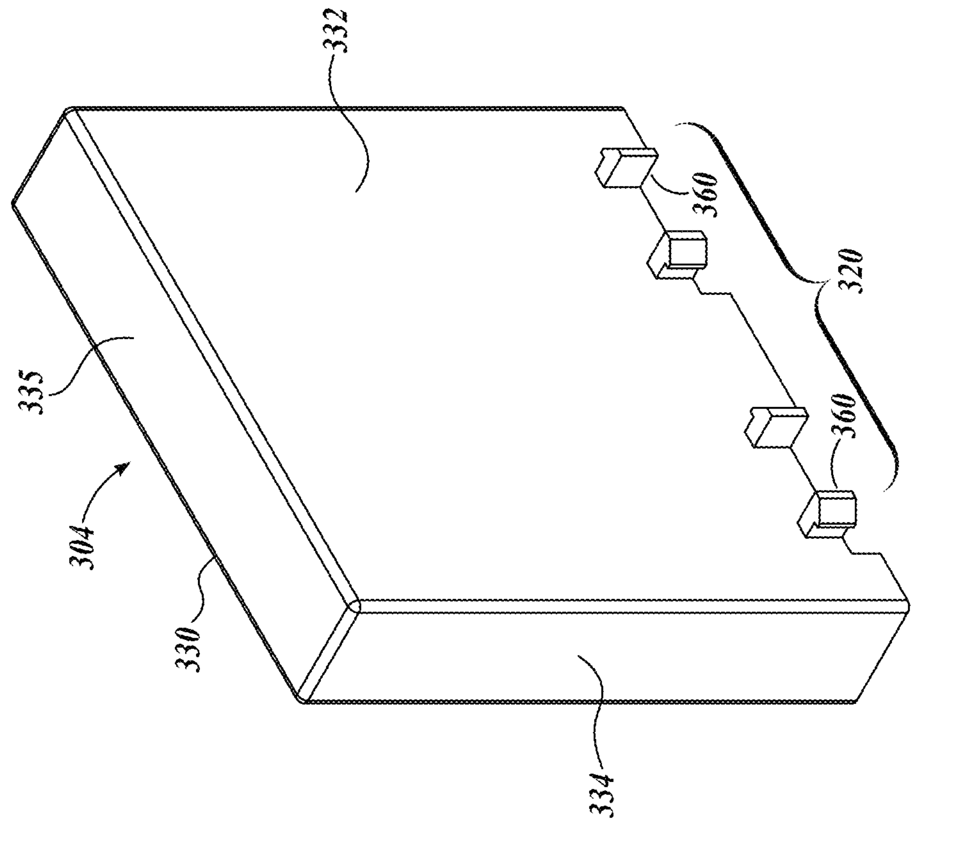
FIG. 14A is a pictorial view of an abutment wall structure of FIG. 11.
Figure 14B:
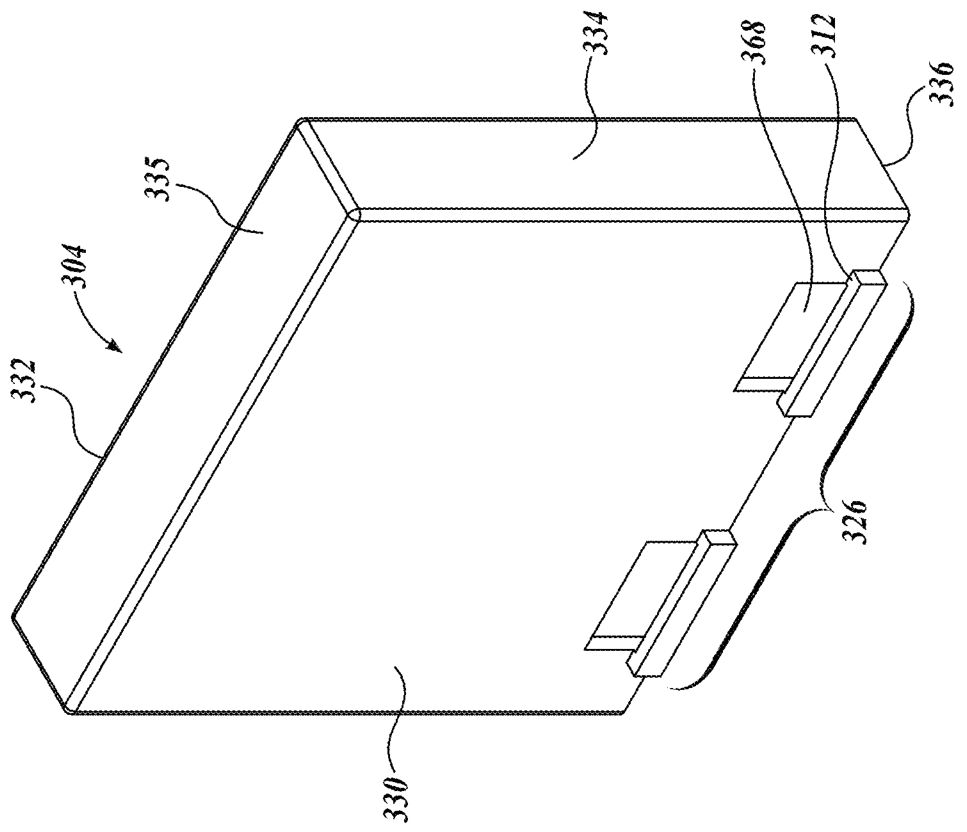
FIG. 14B is a pictorial view of the abutment wall structure of FIG. 14A. but taken from the opposite side of the abutment wall structure.

Referring to FIGS. 13 and 14, the openings 368 are shown as open in the downward direction. A reinforcing bar 370 spans across the opening 368 at the base 306 of the side or face 306 of the tool holder component 302. The height of the top edge 372 of the reinforcing bar 370 coincides with the elevation of the lower surface of the detents 360, which adds to the stability of the modular tool holder 300 when the tool holder components 302 are engaged with corresponding abutment wall structures 304. Further, to accommodate that the reinforcing bar 320 overlaps the exterior side or face of the tool holder component 302, the corresponding portion bottom of the second wall 332 of the abutment wall structure 304 is cut away at 374.

Although a single opening 368 of the female connector structure 326 receives both detents 360 of a pair, instead a separate opening for each detent can be provided. As a result, the detents 360 do not need to be arranged in pairs. Further, the hook sections 364 of the detents 360 do not need to be arranged to extend away from the other detent of a pair.

Figure 12:
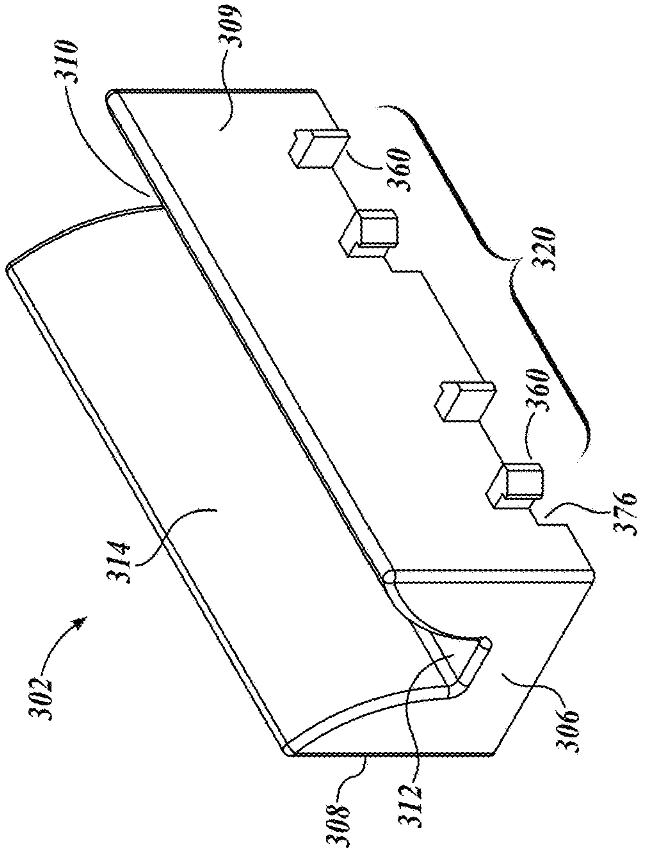
FIG. 12 is a pictorial view of the tool holder component of FIG. 11.
Figure 15:
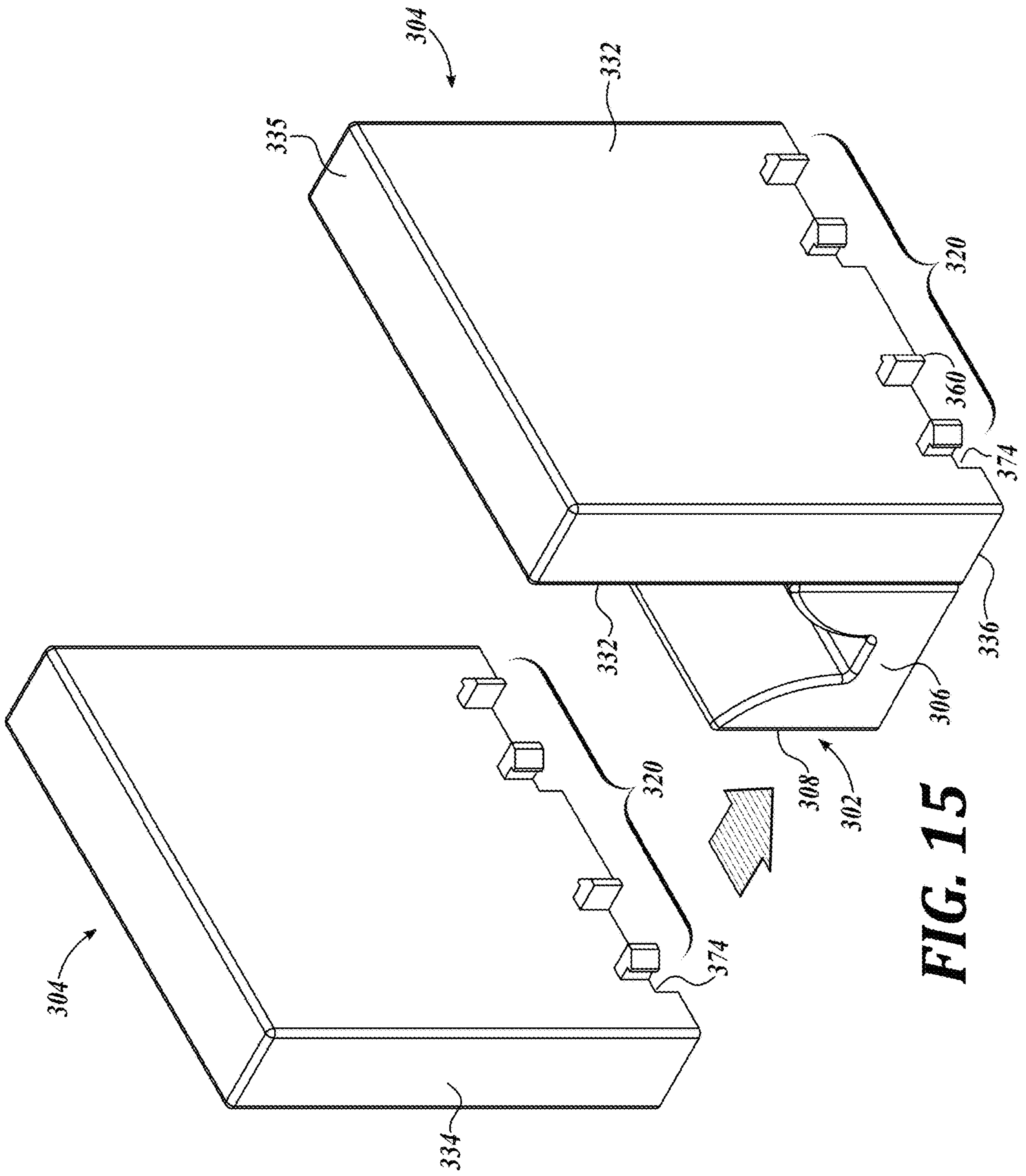
FIG. 15 is the pictorial view of the modular tool holder of FIG. 11 illustrating the assembly and interconnection of the abutment wall with the tool holder component.
Figure 16:
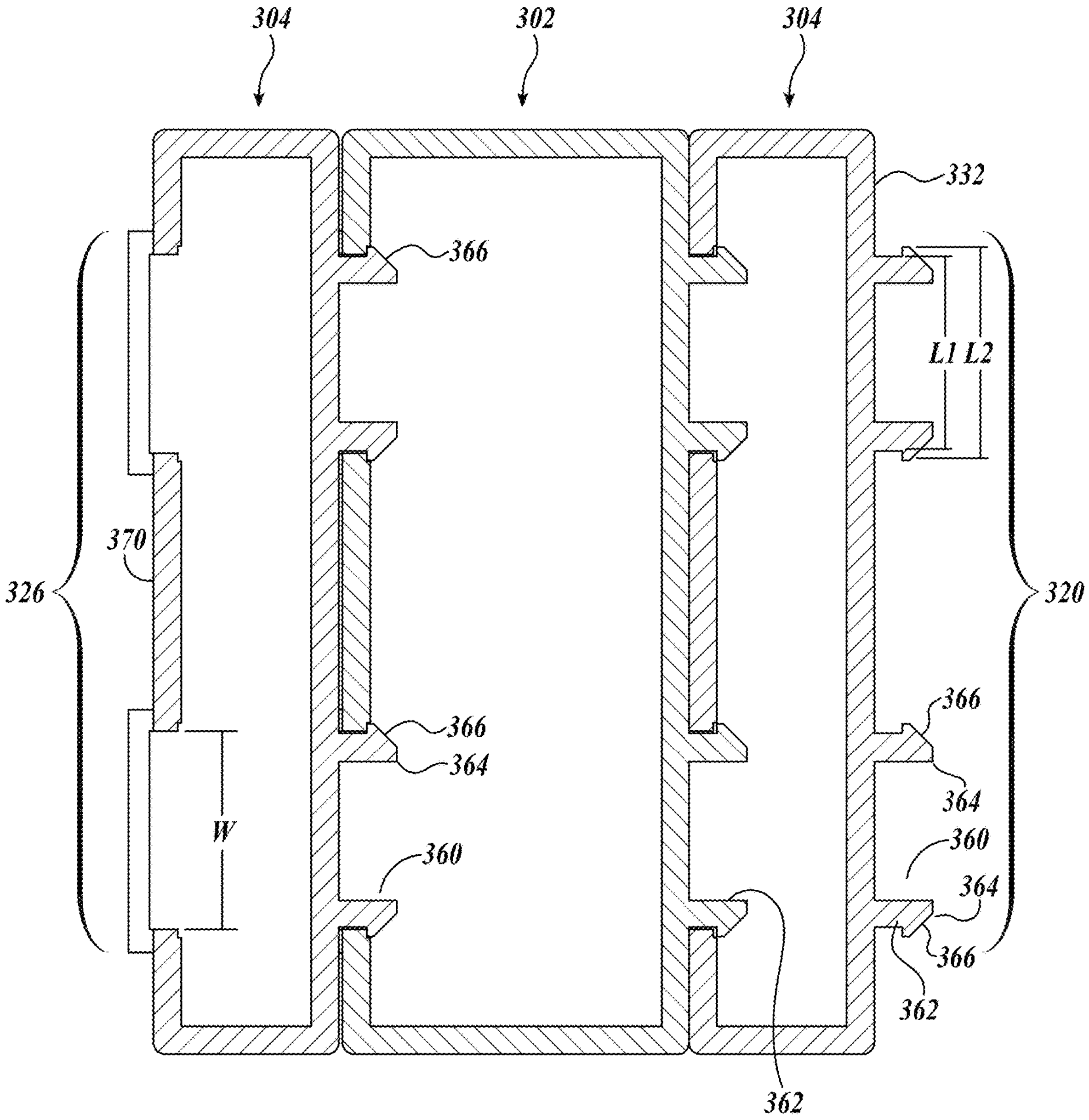
FIG. 16 is a cross-sectional view of the modular tool holder of FIG. 11.

As shown in FIGS. 12, 15, and 16, in the abutment wall structure 304 the male connector structure 320 also is composed of a plurality of detents 360 that project laterally from the base portion 336 along the exterior of the second wall 332 of the abutment wall structure. As discussed above, one configuration of the detents 360 is illustrated as being in the form of a shank section 362 anchored to the exterior side of the second wall 332 at spaced apart locations along the length of the second wall. The distal ends of the shank sections 362 terminate at hook sections 364 that project from one side of the shank sections 362.

As shown in FIGS. 15 and 16, the detents 360 are arranged in pairs so that the hook sections 364 of each pair project away from the other detent of the pair.

The distal or leading surface of each hook section forms a ramp surface 366 that facilitates the engagement of detents with the female connector structure 326 of the tool holder component 302, as discussed below.

The female connector structure 326 of the abutment wall structure 304 is in the form of an opening 368 formed in the bottom of the first wall of the abutment wall structure. The opening 368 is shown as being rectangular in shape, but can be of other shapes. The opening 368 corresponding to a pair of detents 360 of a tool holder component 302.

The opening 368 is a width W that is slightly greater than the distance L1 spanning the far surfaces of the detent shank sections 362 of a detent pair, but is slightly less than the distance L2 spanning the far surfaces of the hook sections of a detent pair. In this manner as discussed below, when a detent pair is engaged with an opening 360 of a female connector structure, the detents are locked into engagement with the opening.

Referring to FIGS. 13 and 14, the openings 368 are shown as open in the downward direction. A reinforcing bar 370 spans across the opening 368 at the base 336 of the first wall 330 of the abutment wall structure 304. The height of the top edge 372 of the reinforcing bar 370 coincides with the elevation of the lower surface of the detents 360, which adds to the stability of the modular tool holder 300 when the abutment wall structures 304 are engaged with corresponding tool holder components 302. Further, to accommodate that the reinforcing bar 370 overlaps the exterior of the first wall 330, the corresponding portion bottom of the exterior face 309 of the tool holder component 302 is cut away at 376.

By the foregoing construction, the tool holder component 302 is conveniently assembled with abutment wall structures 304 by pressing the exterior side of face 309 of the tool holder component against the first wall 330 of the abutment wall structure 304 so that the detents 360 of the tool holder component engage with the openings 368 of the abutment wall structure 304. In this regard, ramp surfaces 366 of the detents 360 of the tool holder component press against the sides of the openings 368 of the first wall 330, causing the detents to flex laterally until the hook section passes through the opening and latches against the inside surface of the first wall. In this position, the sides of the shank sections 362 are also pressed against the sides of the openings 368. As a result, the male connector structure 320 of the tool holder component 302 is securely engaged with the female connector structure 326 of the abutment wall structure 304.

As can be appreciated, the male connector structure 320 of an abutment wall structure 304 is locked into engagement with the female connector structure 326 of a tool holder component 302 in a like manner. In this regard, second wall 332 of the abutment wall structure is pressed towards the exterior face 308 of a tool holder component so that the detents 360 of the abutment wall structure 304 engage with the openings 368 of the tool holder component 302. As such, the ramp surfaces 336 of the detents 360 of the abutment wall structure 304 press against the sides of the openings 368 of the exterior face 308 of the tool holder component 302 causing the detents to flex laterally until the hook sections 364 pass through the openings 368 and latches against the inside surface of the exterior face 308. In this position, the sides of the shank sections 362 are also pressed against the sides of the openings 368. As a result, the male connector structure 320 of the abutment wall structure 304 is securely engaged with the female connector structure 326 of the tool holder component 302.

While illustrative embodiments have been illustrated and described, it will be appreciated that various changes can be made therein without departing from the spirit and scope of the invention. For example, the detents 360 can be of configurations other than as shown in FIGS. 13, 15, and 16. For example, a detent ball can be mounted on the leading end of shank to snuggly engage through a circular hole formed in wall 308 of the tool holder component 302 of the first wall 330 of an abutment wall structure.

Also, instead of the tool holder component and the abutment wall structure both having a male connector structure and a female connector structure, the tool holder or the abutment wall structure can be constructed with two male connector structures or two female connector structures.

In addition, the male connector structure and female connector structure can be of other configurations. For example, the male connector structure can be in the form of an elongate tongue extending horizontally along the one or both exterior sides or faces of the tool holder component. The female connector structure can be in the form of a corresponding horizonal slot formed in one of both of the first and second walls of the abutment wall structure, The horizontal slot is sized and positioned to snugly receive the tongue that extends into and through the horizontal slot. The tongue can be formed with a slight recess adjacent to the exterior sides or faces of the tool holder or adjacent the first and/or second walls of the abutment wall structure for the slot of the abutment wall structure to engage and lock into.

Alternatively, the elongate tongues can extend horizontally along the exterior of the first and second walls of the abutment wall structure and the slots can extend horizontally along the exterior sides of faces of the tool holder component.

As a further example, the first ridge140 can integrated into the tip of the bade 122.

As a further example, a fourth embodiment 400 of a modular tool holder according to the present disclosure similar to the modular tool holder 100 is shown. In this regard, the components of the modular tool holder 400 that correspond to the modular tool holder 100 is identified with a corresponding 400 series part number. Further, the aspects of the modular tool holder 400 that are the same or similar to modular tool holder 100 is not repeated.

The modular tool holder 400 includes a tool holder component 402 that is similar to tool holder component 102, but with a channel 410 that is adapted to hold a screw driver. In this regard, the tool receiving surface 412 is higher above the base portion 406 than is the receiving surface 112 above base 106, to provide clearance for the screw driver handle. Also the receiving surface 412 is narrower than receiving surface 112 since the shank of a screw drive is generally relatively narrow.

In addition, the tool holder component 402 incudes a lower or first sloped interior side or surface 414 extending upward and outward from the receiving surface 412 to intersect the bottom of an upper or second further sloped surface 415 that extends further outward and upward to the top of the tool holder component to intersect the exterior sides or faces 408 and 409.

The abutment wall structure 404 is constructed with an open top edge 435 and is adapted to receive an insertable top or cover 478 to close off the open top. The cover 478 can include indicia to indicate, for example, the type and/or size of the mechanics tool to be held by the modular tool holder 400. In this regard, see for example, U.S. Pat. No. 11,945,095, which is incorporated herein by reference. Alternatively, the indicia can be applied to the cover 478 by, for example, an adhesive.

Figure 17:
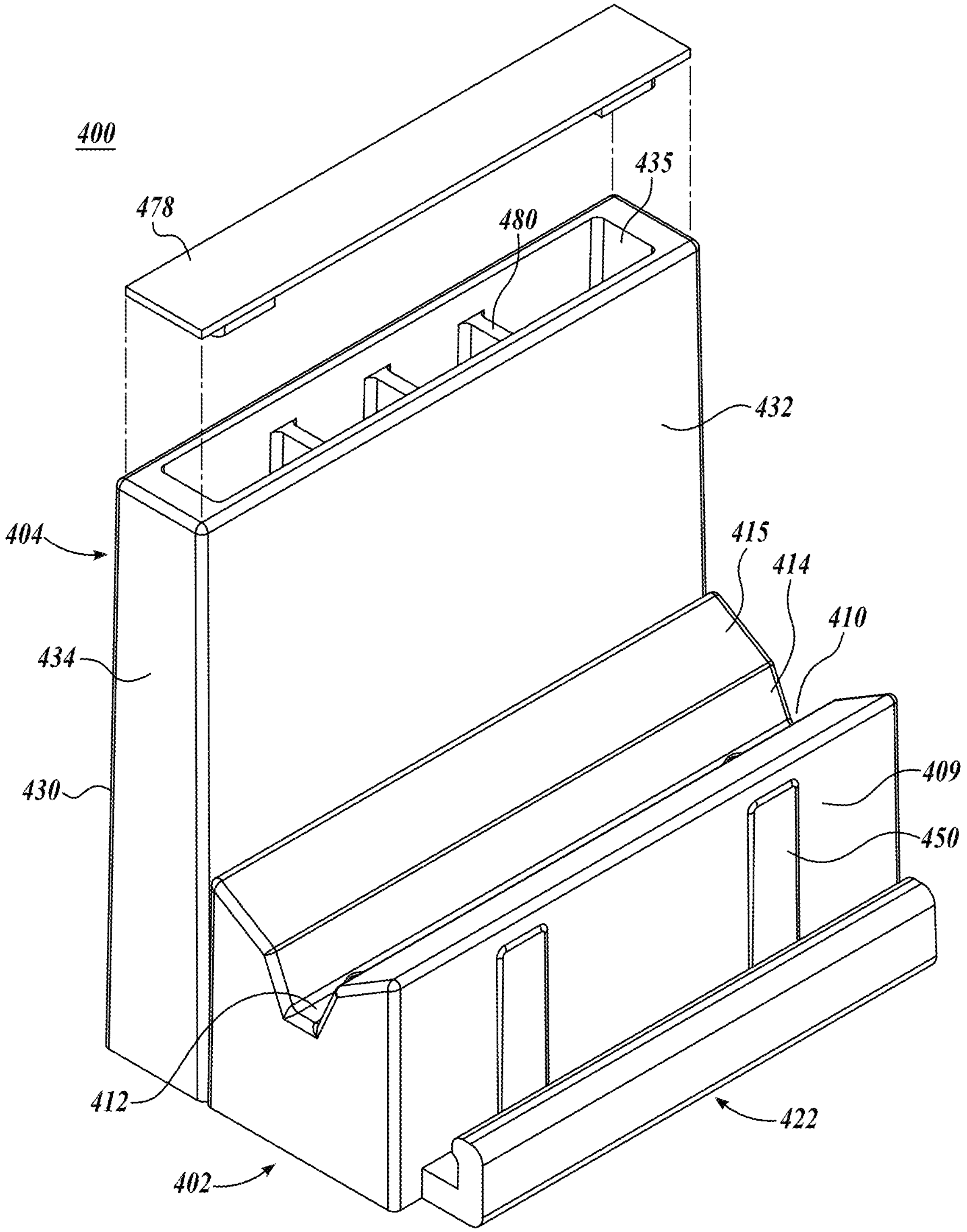
FIG. 17 is a pictorial view of a fourth embodiment of a modular tool holder of the present disclosure showing a tool holder component assembled with am abutment wall structure.

As shown in FIG. 17, the abutment wall structure can be strengthened and stiffened by cross walls 480 that span between the side walls 430 and 432. Although three cross walls 480 are shown, the number of cross walls can be increased or decreased in number.

The embodiments of the invention in which an exclusive property or privilege is claimed are defined as follows:

1. A modular tool holder for holding an array of different mechanic's tools, comprising:

at least one tool holder component having opposed first and second faces each extending upwardly from a longitudinally extending base, the first and second faces separated by an intermediate section contoured to receive and hold a mechanics tool, the tool holder component comprising a male connector structure disposed along the base of the first face and a female connector structure disposed along the base of the second face;

an abutment wall structure extending upwardly from a longitudinally extending base to a height above the tool holder component, the abutment wall structure having a first wall and a second wall spaced from the first wall, a female connector structure incorporated into the first wall to interconnect with the male connector structure of the at least one tool holder component, and a male connector structure at the base of the second wall to interconnect with the female connector structure of an adjacent at least one tool holder component;

wherein the male connector structure comprising an elongate blade extending longitudinally along and upwardly from the base of the first face of the tool holder component and extending longitudinally along and upwardly from the base of the second wall of the abutment wall structure; and wherein the female connector structure forming a downwardly open cavity to receive the elongate blade in the direction upwardly into the downwardly open cavity.

2. The modular tool holder of claim 1, wherein the elongate blade extends upwardly from the base of the first face of the tool holder component and extends upwardly from the base of the second wall of the abutment wall structure and the female connector structure comprises an interior of the second face of the tool holder component or the and an interior of the first wall of the abutment wall structure.

3. The modular tool holder of claim 2, further comprising a lock for assisting in maintaining the engagement of the elongate blade with the female connector structure.

4. The modular tool holder of claim 3, wherein the lock comprising a first longitudinal ridge extending along the elongate blade and a second longitudinal ridge extending along the interior of the second face of the tool holder component or the interior of the first wall of the abutment wall structure, wherein during engagement of the tool holder component with the abutment wall structure, the first ridge slides over the second ridge in a direction laterally to the length of the first and second ridges to a position side-by-side to the second ridge.

5. The modular tool holder of claim 1, wherein the elongate blade is spaced outwardly from the base of the first face of the tool holder component and outwardly from the base of the second wall of the abutment wall structure.

6. The modular tool holder of claim 1, further comprising a plurality of side strips on at least one the first and second faces of a tool holder component.

7. The modular tool holder of claim 1, further comprising a plurality of side strips on at least one the first and second walls of the abutment wall structure.

8. The modular tool holder of claim 1, comprising a plurality of tool holder components interconnected wherein a male connector structure of one tool holder component is interconnected with the female connector structure of an adjacent tool holder component.

9. A modular tool holder for holding an array of different mechanic's tools, comprising:

at least one tool holder component having opposed first and second faces each extending upwardly from a longitudinally extending base, the first and second faces separated by an intermediate section contoured to receive and hold a mechanics tool, the tool holder component comprising a male connector structure disposed along the base of the first face and a female connector structure disposed along the base of the second face;

an abutment wall structure extending upwardly from a longitudinally extending base to a height above the tool holder component, the abutment wall structure having a first wall and a second wall spaced from the first wall, a female connector structure incorporated into the first wall to interconnect with the male connector structure of the at least one tool holder component with the first wall of the abutment wall structure in face to face proximity to the first face of the at least one tool holder, and a male connector structure at the base of the second wall to interconnect with the female connector structure of an adjacent at least one tool holder component with the second wall of the abutment wall structure in face to face proximity to the second face of the adjacent at least one tool holder;

wherein the male connector structure comprising at least one projection member extending along and upwardly from the base of the first face of the tool holder component and extending along and upwardly from the base of the second wall of the abutment wall structure; and wherein the female connector structure forming a downwardly open cavity to receive the at least one projection member upwardly into the downwardly open cavity.

10. The modular tool holder of claim 9, wherein the male connector structure comprising a longitudinal blade extending along the base of the first face of the tool holder component and extending along the base of the second wall of the abutment wall structure.

11. The modular tool holder of claim 10, wherein the blade is spaced outwardly from the base of the first face of the tool holder component and outwardly from the base of the second wall of the abutment wall structure.

12. The modular tool holder of claim 10, further comprising a lock for assisting in maintaining the engagement of the longitudinal blade with the female connector structure.

13. The modular tool holder of claim 12, wherein the lock comprising a first longitudinal ridge extending along the longitudinal blade and a second longitudinal ridge extending along the interior of the second face of the tool holder component or the interior of the first wall of the abutment wall structure, wherein during engagement of the tool holder component with the abutment wall structure, the first ridge slides over the second ridge in a direction laterally to the length of the first and second ridges to a position side-by-side to the second ridge.

* * * * *